US012401156B2

(12) United States Patent
Kim et al.

(10) Patent No.: US 12,401,156 B2
(45) Date of Patent: Aug. 26, 2025

(54) CABLE CONNECTOR

(71) Applicant: LG Display Co., Ltd., Seoul (KR)

(72) Inventors: Jeong Hwan Kim, Paju-si (KR); Jun Ho Cho, Paju-si (KR); Jun Hee Han, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 391 days.

(21) Appl. No.: 17/980,257

(22) Filed: Nov. 3, 2022

(65) Prior Publication Data

US 2023/0216240 A1 Jul. 6, 2023

(30) Foreign Application Priority Data

Dec. 31, 2021 (KR) ........................ 10-2021-0194807

(51) Int. Cl.
*H01R 13/52* (2006.01)
*H01R 13/62* (2006.01)
*H01R 13/64* (2006.01)

(52) U.S. Cl.
CPC ..... *H01R 13/6205* (2013.01); *H01R 13/5213* (2013.01); *H01R 13/64* (2013.01)

(58) Field of Classification Search
CPC ............ H01R 13/6205; H01R 13/5213; H01R 13/54; H01R 12/721
See application file for complete search history.

(56) References Cited

U.S. PATENT DOCUMENTS 6,174,188 B1 * 1/2001 Martucci ............ G06K 13/0862 439/331
6,241,545 B1 * 6/2001 Bricaud ............... G06K 7/0021 439/331
6,669,503 B2 * 12/2003 Hirose ................... H01R 12/88 439/495
6,855,002 B2 * 2/2005 Chiu ...................... H01R 12/88 439/495
6,866,530 B1 * 3/2005 Yen-Lin ................. H01R 12/83 439/326
6,869,302 B2 * 3/2005 Bricaud ............... G06K 7/0021 439/331
6,896,548 B2 * 5/2005 Scuteri ............. G06K 19/07741 439/541.5
7,172,449 B2 * 2/2007 Shindo ................. H01R 12/716 439/341
7,384,294 B2 * 6/2008 Washino .............. G06K 7/0026 439/326
7,887,357 B1 * 2/2011 Yang .................... G06K 7/0082 439/331
7,892,008 B2 * 2/2011 Hsu ...................... H01R 13/639 439/893

(Continued)

*Primary Examiner* — Thanh Tam T Le
(74) *Attorney, Agent, or Firm* — Birch, Stewart, Kolasch & Birch, LLP

(57) ABSTRACT

A cable connector for fixing a fastening a cable can include a connector cover rotatable fastened to a connector body, and a cover fixing unit disposed on a side of the connector body. The connector cover can include connector terminals arranged side by side along an edge of an end thereof, and a guide groove extending in a direction in which the connector terminals are arranged. Thus, in the cable connector, a flat cable can be inserted into the cable connector in the width direction. As such, damage to the cable connector in the fastening process of the flat cable can be prevented.

10 Claims, 14 Drawing Sheets

(56) References Cited

U.S. PATENT DOCUMENTS

| | | | | |
|---|---|---|---|---|
| 7,967,608 | B2 * | 6/2011 | Chien | H01R 13/6205<br>439/38 |
| 8,062,048 | B2 * | 11/2011 | Ma | H01R 12/88<br>439/331 |
| 8,152,552 | B2 * | 4/2012 | Jackson | G06K 7/0052<br>439/328 |
| 9,581,773 | B2 * | 2/2017 | Okabe | G02B 6/4261 |
| 9,609,098 | B2 * | 3/2017 | Lee | H04M 1/0274 |

* cited by examiner

CABLE CONNECTOR

CROSS-REFERENCE TO RELATED APPLICATIONS

This application claims priority to Korean Patent Application No. 10-2021-0194807, filed in the Republic of Korea on Dec. 31, 2021, the entire contents of which are hereby incorporated by reference into the present application.

BACKGROUND OF THE INVENTION

Field of the Invention

The present disclosure relates to a cable connector for fixing and fastening a flat cable.

Discussion of the Related Art

Generally, a cable connector is used to fix and fasten a flat cable on a printed circuit board. For example, the cable connector can be fixed on the printed circuit board. The flat cable can be inserted into the cable connector in the front direction.

However, when the flat cable is inserted unbalanced, a terminal of the flat cable can be over-inserted and damaged. Thus, there is a need for a fastening structure capable of preventing over-insertion of the flat cable and a cable connector to which the fastening structure is applied.

SUMMARY OF THE INVENTION

Accordingly, the present disclosure is directed to a cable connector that substantially obviates one or more problems due to limitations and disadvantages of the related art.

An object of the present disclosure is to provide a cable connector capable of preventing damage due to incorrect fastening and over-insertion of the flat cable.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the present disclosure, as embodied and broadly described herein, there is provided a cable connector comprising a connector body disposed on a base substrate. A connector cover is rotatable fastened to the connector body. Connector terminals disposed side by side along an edge and a guide groove extending in a direction in which the connector terminals are arranged are disposed at an end of the connector cover. A cover fixing unit is disposed on a side of the connector body. The cover fixing unit extends on an upper surface of the connector body.

According to an aspect of the present invention, the guide groove can include a first region and a second region. The first region can extend from a surface of the connector cover. The second region can be connected to the first region. The second region can have a larger width than the first region.

According to an aspect of the present invention, a guide rail can be disposed between the base substrate and the cover fixing unit. The guide rail can provide a moving path of the cover fixing unit.

According to an aspect of the present invention, a first magnetic element can be embedded in the guide rail. The first magnetic element can be disposed at an end of the guide rail toward the connector terminals of the connector cover. A second magnetic element embedded in the cover fixing unit. The second magnetic element can be disposed to corresponding to the first magnetic element.

According to an aspect of the present invention, a first magnetic element can be embedded in a surface of the connector body toward the cover fixing unit. The first magnetic element can be disposed at an end of the connector body toward the connector terminals of the connector cover. A second magnetic element can be embedded in the cover fixing unit. The second magnetic element can be disposed to corresponding to the first magnetic element.

According to an aspect of the present invention, an elastic element can be attached to a surface of the connector cover toward the base substrate. The elastic element can be disposed between the guide groove and the connector terminals.

According to an aspect of the present invention, a fix coupling unit can be disposed outside of the cover fixing unit. The fix coupling unit can include a coupling body having an inner space, and a coupling protrusion. The coupling body can include a first hole toward the cover fixing unit and a second hole opposite to the first hole. The coupling protrusion can include a head portion disposed inside the inner space, and a protruding portion extending from the head portion. The protruding portion can pass through the second hole. The cover fixing unit can include a projection part protruding toward the fix coupling unit, and an elastic body fastened to the projection part.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION OF THE EMBODIMENTS

Figure 1A:
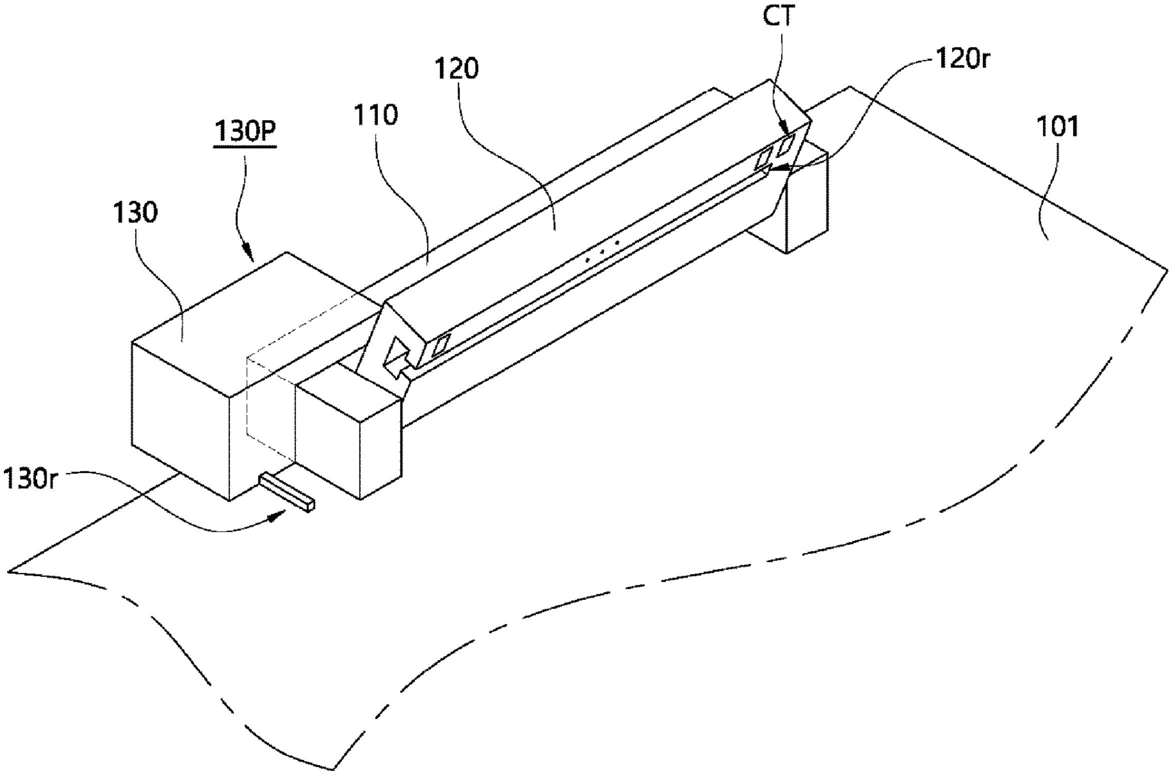
FIGS. 1A and 1B are views schematically showing a cable connector according to an embodiment of the present disclosure.

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure can be embodied in other forms and is not limited to the embodiments described below.

In addition, the same or extremely similar elements can be designated by the same reference numerals throughout the specification and in the drawings, the lengths and thickness of layers and regions can be exaggerated for convenience. It will be understood that, when a first element is referred to as being "on" a second element, although the first element can be disposed on the second element so as to come into contact with the second element, a third element can be interposed between the first element and the second element.

Here, terms such as, for example, "first" and "second" can be used to distinguish any one element with another element. However, the first element and the second element can be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

And, unless 'directly' is used, the terms "connected" and "coupled" can include that two components are "connected" or "coupled" through one or more other components located between the two components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiments

Figure 1B:
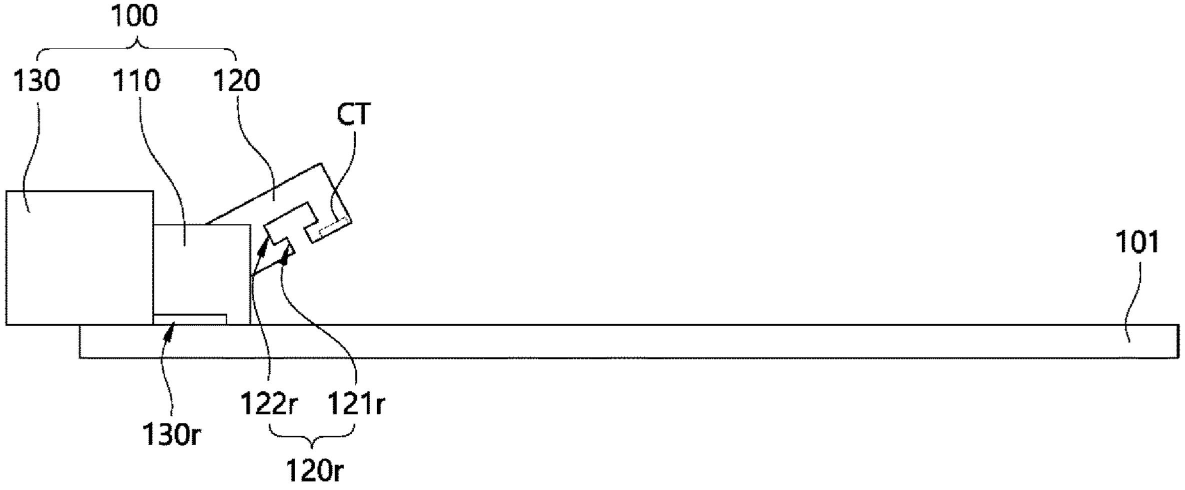

FIGS. 1A and 1B are views schematically showing a cable connector according to an embodiment of the present disclosure.

Referring to FIGS. 1A and 1B, a cable connector 100 according to the embodiment of the present disclosure can include a connector body 110 disposed on a base substrate 101, a connector cover 120 rotatable fastened to the connector body 110, and a cover fixing unit 130 disposed on a side of the connector body 110.

The connector body 110 can support an operation of the connector cover 120. For example, the connector body 110 can be fixed on the base substrate 101. The connector cover 120 can include connector terminals CT and a guide groove 120*r*. The connector terminals CT can be electrically connected to a flat cable. For example, the connector terminals CT can be disposed side by side along an edge of the connector cover 120. The guide groove 120*r* can guide the insertion of the flat cable. For example, the guide groove 120*r* can extend in a direction in which the connector terminals CT are arranged. The cover fixing unit 130 can be disposed on a side of the connector body 110. The cover fixing unit 130 can extend on an upper surface of the connector body 110. For example, the cover fixing unit 130 can include a cover area 130P covering the upper surface of the connector body 110.

The guide groove 120*r* can have a shape to prevent separation of the flat cable during the fastening process. For example, the guide groove 120*r* can include a first region 121*r* extending from a surface of the connector cover 120, and a second region 122*r* connected to the first region 121*r*, in which the second region 122*r* can have a larger width than the first region 121*r*.

A guide rail 130*r* can be disposed between the base substrate 101 and the cover fixing unit 130. The guide rail 130*r* can provide the movement path of the cover fixing unit 130. For example, the cover fixing unit 130 can be moved along the guide rail 130*r*.

FIGS. 2A to 4B are views sequentially showing an operation of fixing and fastening a flat cable to a cable connector according to the embodiment of the present disclosure. For instance, FIGS. 2A, 3A and 4A can be plan views of the operation and FIGS. 2B, 3B and 4B can be corresponding side views, respectively.

A process in which the flat cable Cb is fixed and fastened to the cable connector 100 according to the embodiment of the present disclosure will be described with reference to FIGS. 2A to 4B.

Figure 2A:
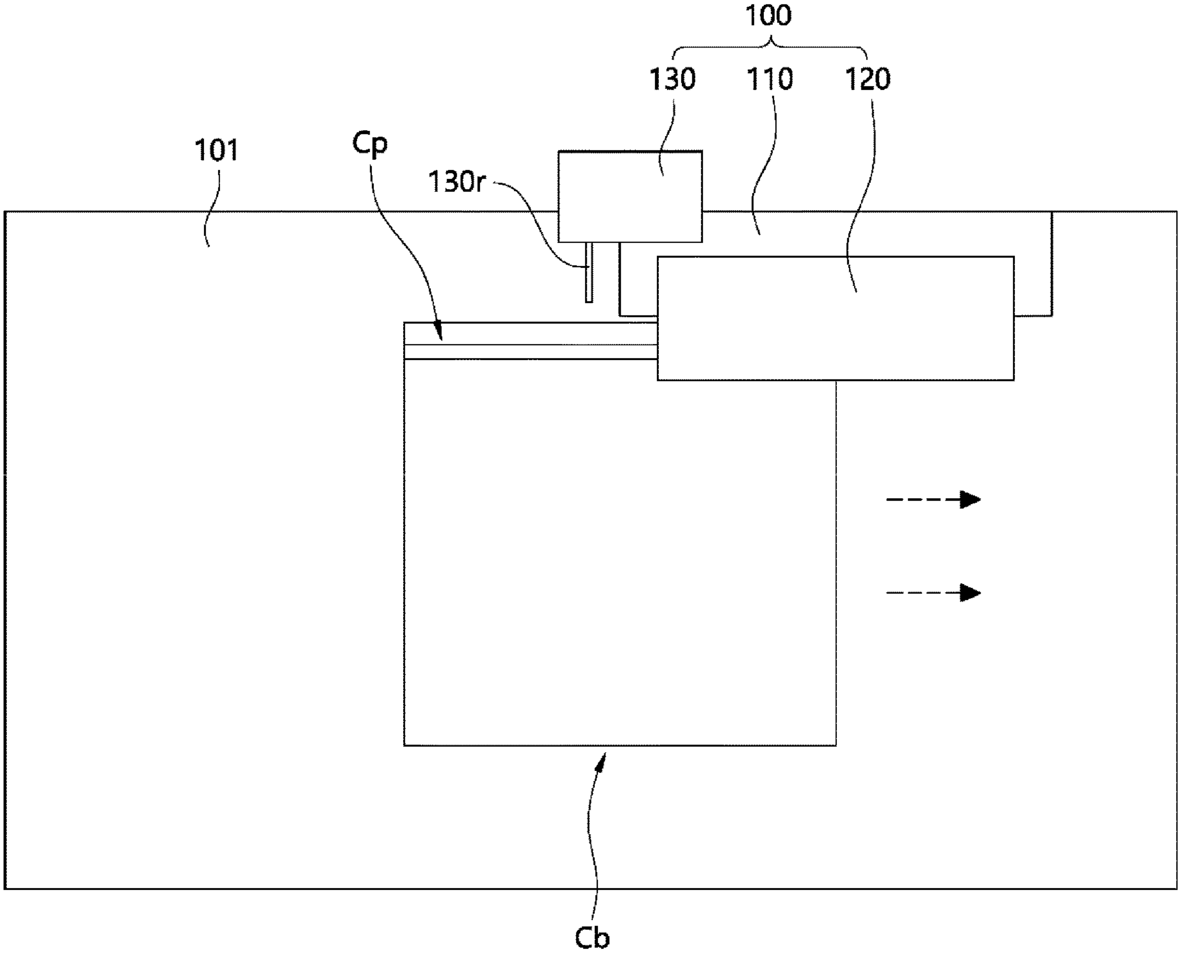
FIGS. 2A to 4B are views sequentially showing an operation of fixing and fastening a flat cable to a cable connector according to the embodiment of the present disclosure.
Figure 2B:
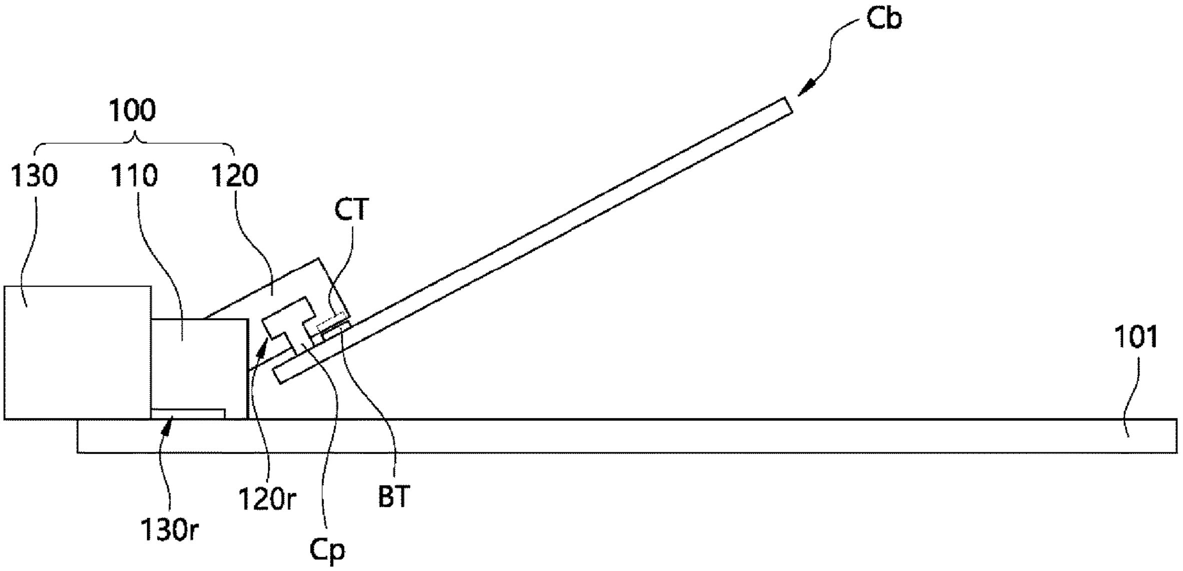

First, the fastening process of the cable connector according to the embodiment of the present disclosure can include a step of inserting a fastening protrusion Cp of the flat cable Cb into the guide groove 120*r* of the connector cover 120, as shown in FIGS. 2A and 2B.

The fastening protrusion Cp can have a shape corresponding to the guide groove 120*r*. Thus, in the embodiment of the present disclosure, the flat cable Cb can be not separated from the connector cover 120 during the fastening process. The fastening protrusion Cp can extend in a width direction of the flat cable Cb. Thus, in the embodiment of the present disclosure, the flat cable Cb can be inserted into the connector cover 120 in a side sliding way.

Figure 3A:
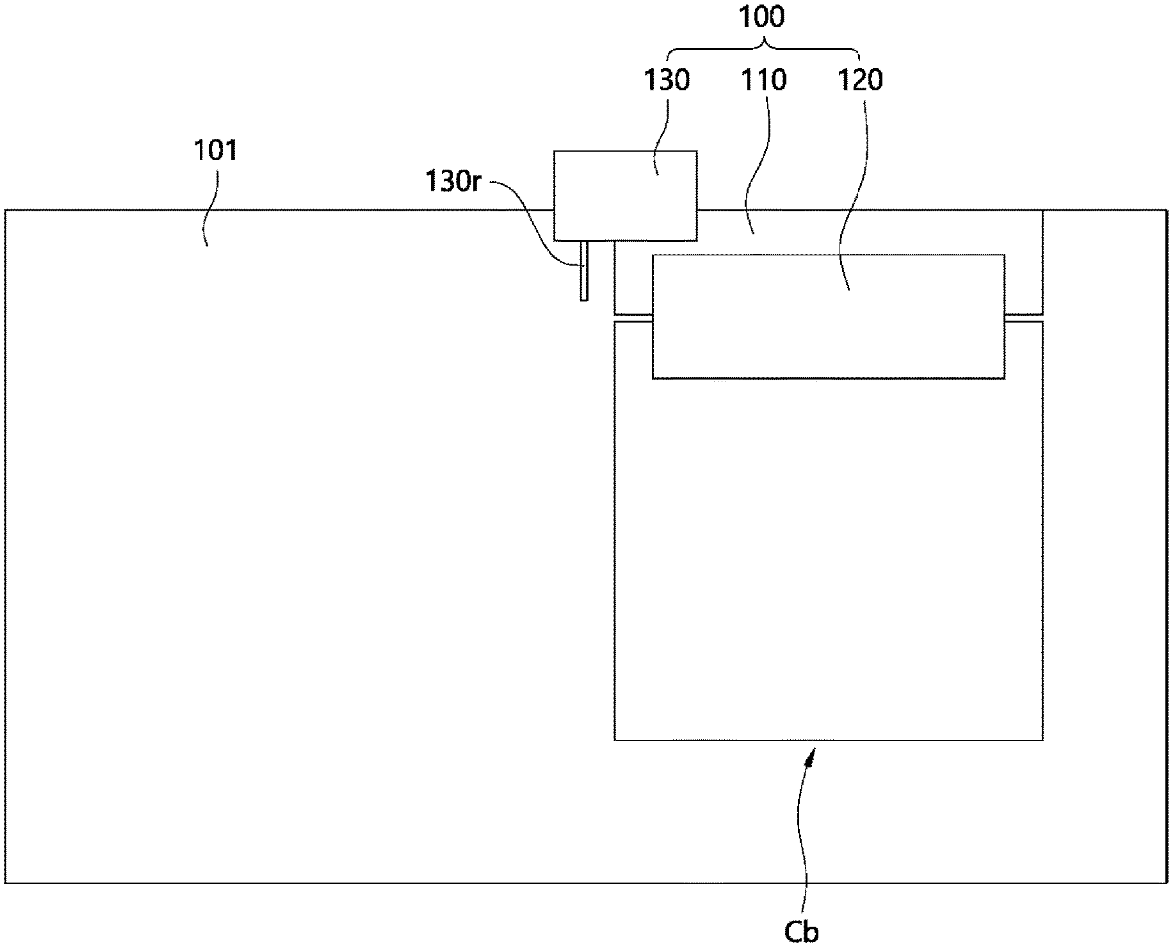
Figure 3B:
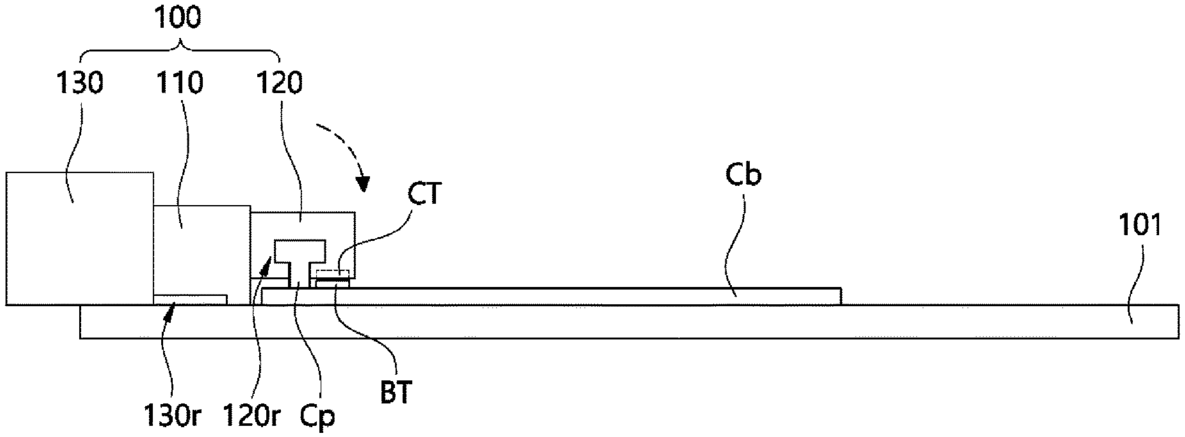

In the fastening process according to the embodiment of the present disclosure, the connector cover 120 fastened to the flat cable Cb by the guide groove 120*r* can rotate in the direction of the base substrate 101 to compress the flat cable Cb, as shown in FIGS. 3A and 3B. Thus, in the fastening process according to the embodiment of the present disclosure, the connector terminals CT arranged side by side along an edge of the connector cover 120 can be contact with cable terminals BT of the flat cable Cb.

Figure 4A:
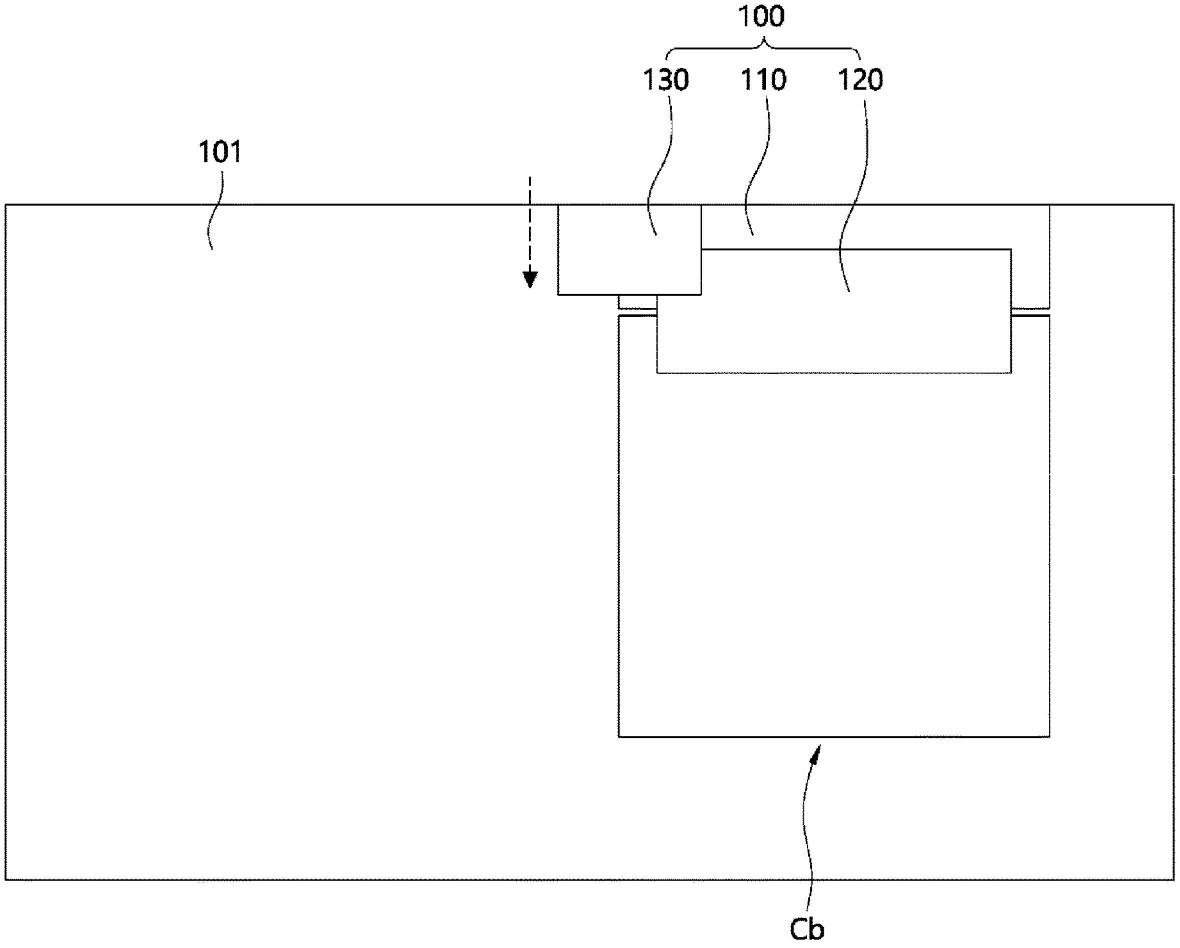
Figure 4B:
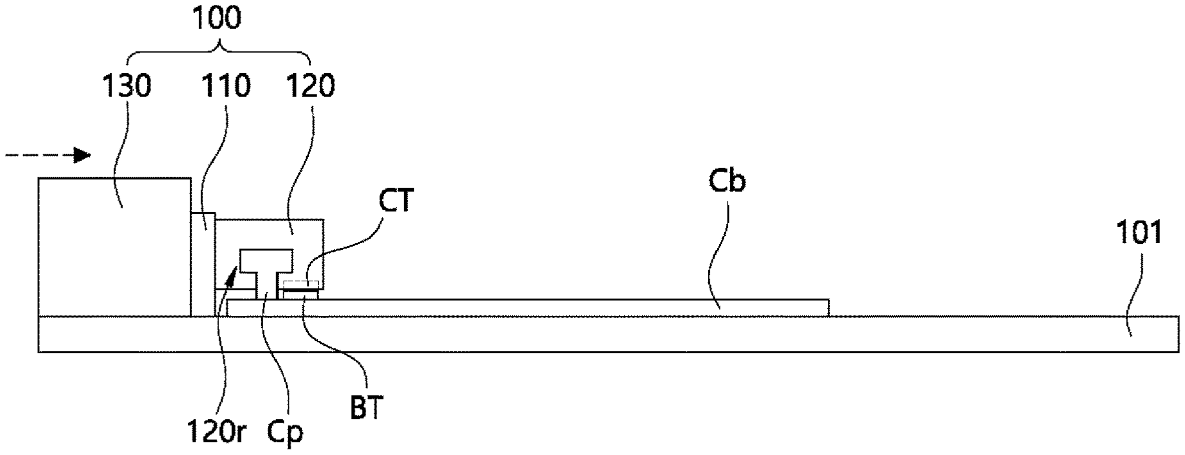

In the fastening process according to the embodiment of the present disclosure, the cover fixing unit 130 can move in a direction of the connector cover 120 pressing the flat cable Cb as shown in FIGS. 4A and 4B. Thus, in the fastening process according to the embodiment of the present disclosure, the cover area 130P of the cover fixing unit 130 can cover a portion of the connector cover 120. For example, in the fastening process according to the embodiment of the present disclosure, the connector cover 120 may be not rotated by the cover area 130P of the cover fixing unit 130. Therefore, in the fastening process according to the embodiment of the present disclosure, the electrically connection between the connector terminals CT of the connector cover 120 and the cable terminals BT of the flat cable Cb can be maintained by the cover fixing unit 130.

Accordingly, in the cable connector 100 according to the embodiment of the present disclosure, the flat cable Cb can be inserted in a side sliding way, wherein the connector terminals CT of the cable connector 100 can be stably connected to the cable terminals BT of the flat cable Cb by the connector cover 120 and the cover fixing unit 130. Therefore, the cable connector 100 according to the embodiment of the present disclosure can prevent the damage of the flat cable Cb in the fastening process, and stably maintain the electrically connection between the connector terminals CT and the cable terminals BT.

Figure 5A:
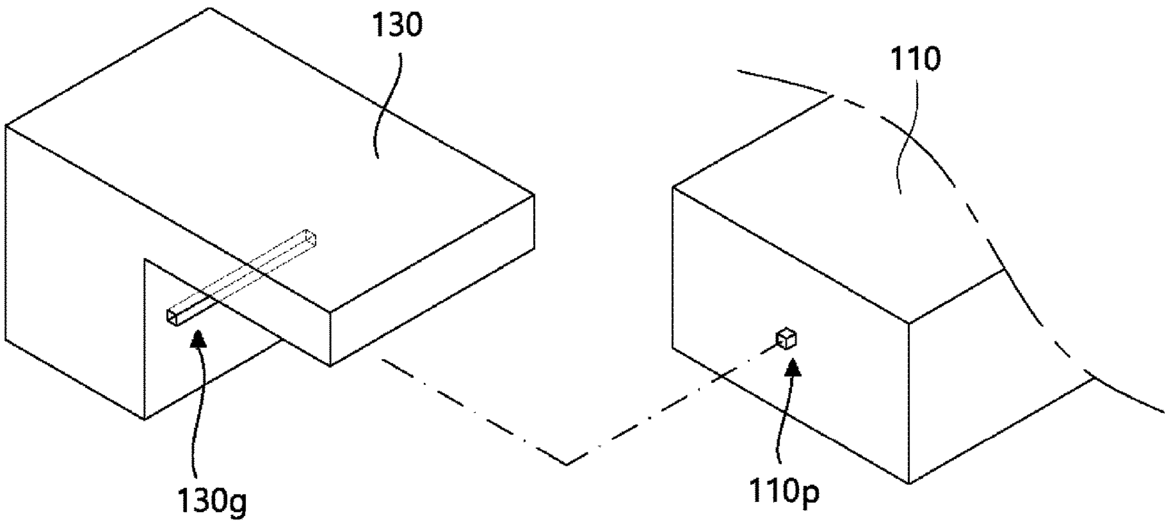
FIGS. 5A, 5B, 6A, 6B, 7A, 7B, 8 to 10, and 11A to 11D are views showing the cable connector according to another embodiment of the present disclosure.
Figure 5B:
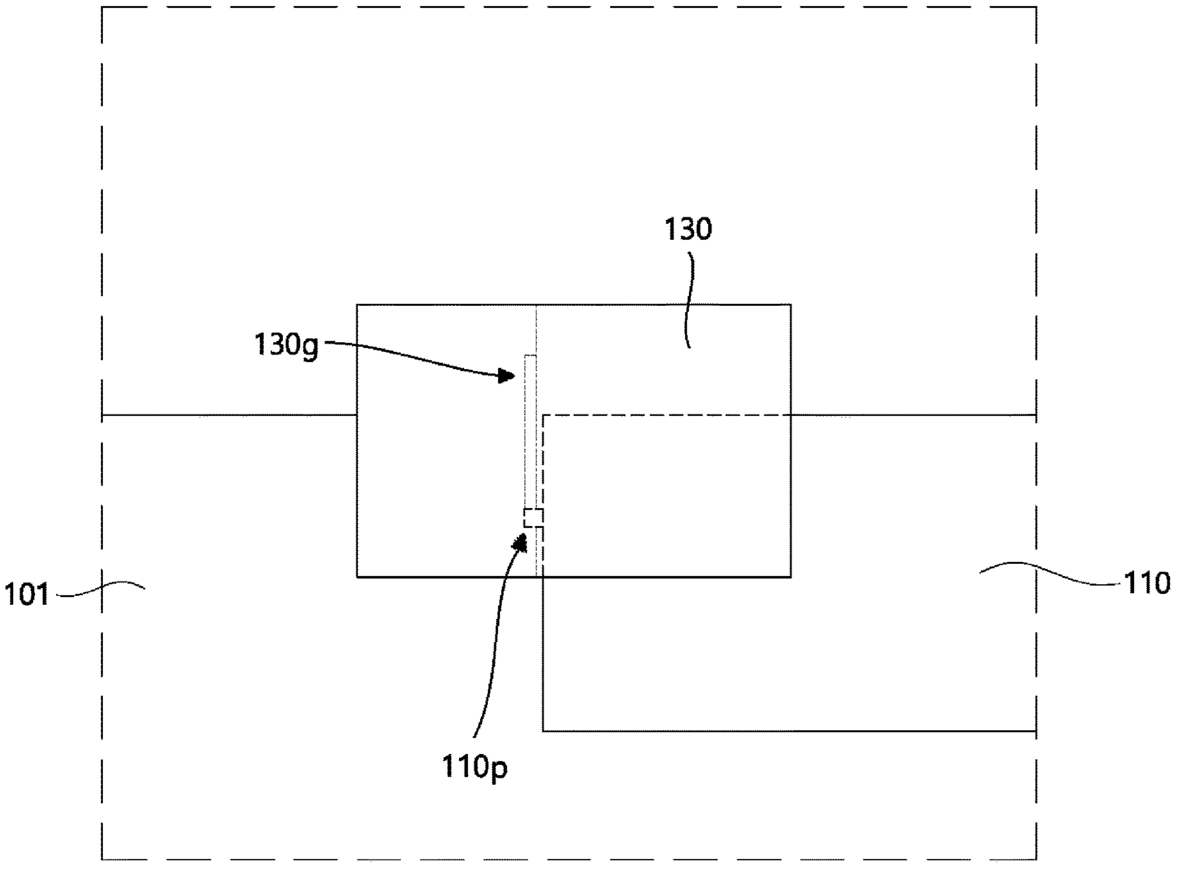

The cable connector 100 according to the embodiment of the present disclosure is described that the cover fixing unit 130 is moved along the guide rail 130*r* formed on the base substrate 101. However, in the cable connector according to another embodiment of the present disclosure, a movement path of the cover fixing unit 130 can be provided in various ways. For example, in the cable connector according to another embodiment of the present disclosure, a protruding portion 110*p* can be disposed on a side of the connector body 110 toward the cover fixing unit 130, a groove 130*g* of the cover fixing unit 130 can extend in a side direction, and the cover fixing unit 130 can be moved laterally by the coupling of the protruding portion 110*p* and groove 130*g*, as shown in FIGS. 5A and 5B.

Figure 6A:
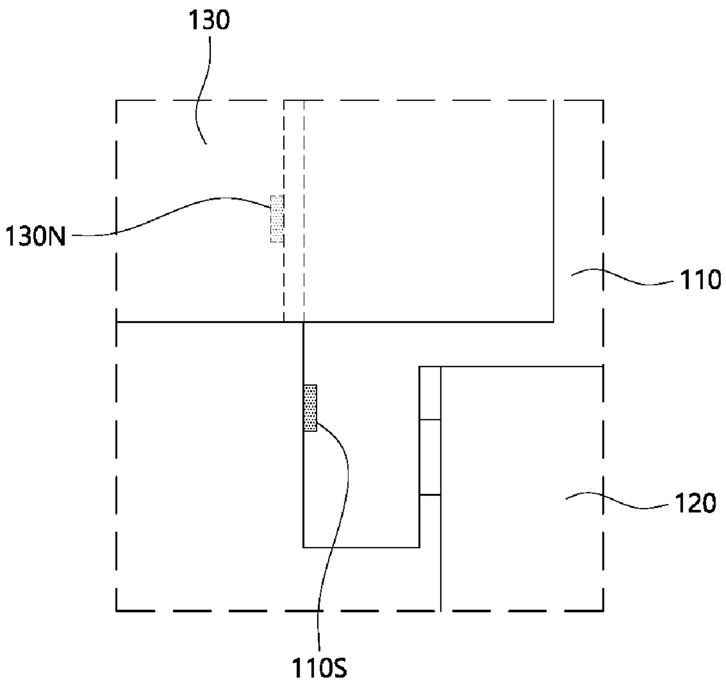
Figure 6B:
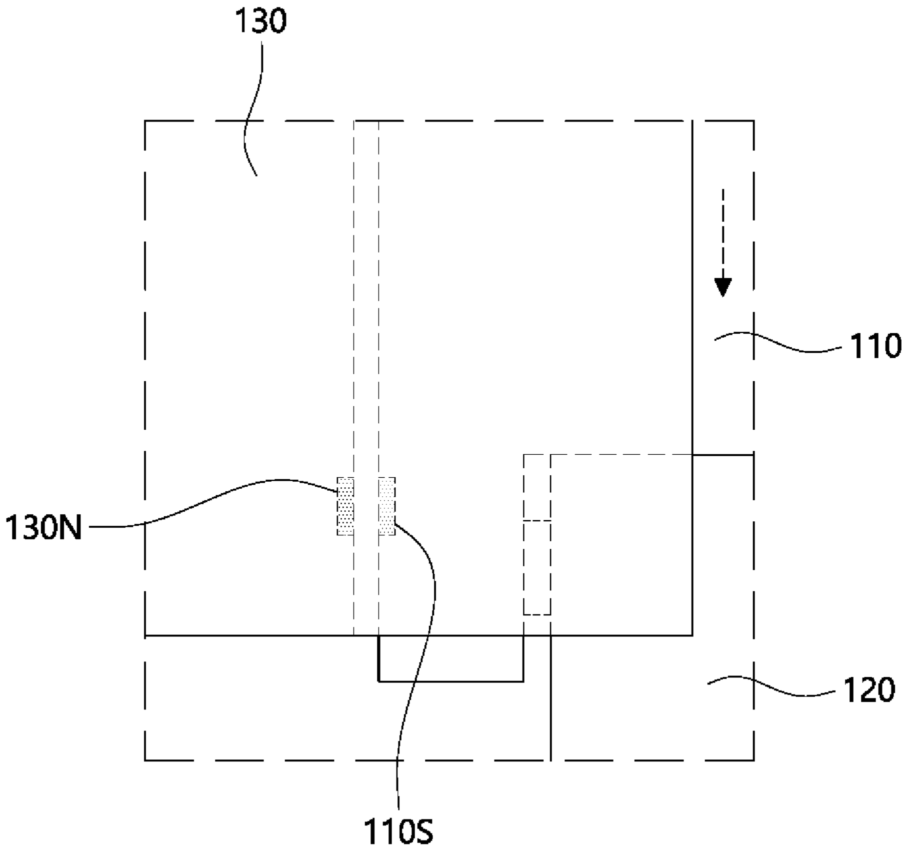

In another embodiment of the present disclosure, a first magnetic element 110S can be embedded in a side of the connector body 110 toward the cover fixing unit 130, a second magnetic element 130N can be embedded in a side of the cover fixing unit 130 toward the connector body 110, as shown in FIG. 6A. The second magnetic element 130N can be disposed on corresponding to the first magnetic element 110S. For example, when the cover fixing unit 130 is moved to prevent the rotation of the connector cover 120, the second magnetic element 130N can face the first magnetic element 110S, as shown in FIG. 6B. For example, the first magnetic elements 110S can be disposed at an end of the connector body 110 toward the connector terminals CT of the connector cover 120. Thus, in the cable connector 100 according to another embodiment of the present disclosure, the movement of the cover fixing unit 130 can be prevented by the first magnetic element 110S embedded in the connector body 110 in a state in which the rotation of the connector cover 120 is blocked by the cover area 130P. Therefore, in the cable connector 100 according to another embodiment of the present disclosure, the connector terminals CT can be stably connected to the cable terminals BT.

Figure 7A:
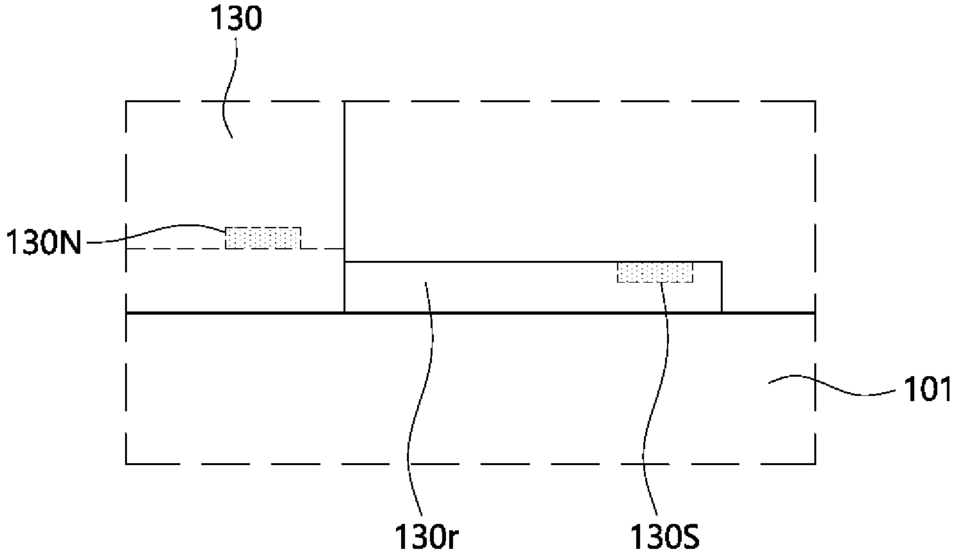
Figure 7B:
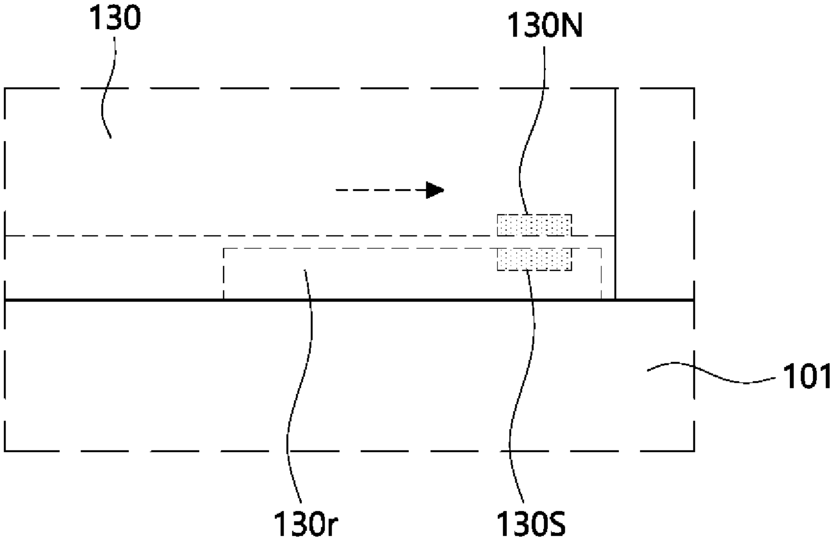

The cable connector 100 according to another embodiment of the present disclosure can include a first magnetic element 130S embedded in an end of the guide rail 130*r*, as shown in FIGS. 7A and 7B. For example, the first magnetic element 130S can be disposed at the end of the guide rail 130*r* toward the connector terminals CT of the connector cover 120. Thus, in the cable connector 100 according to another embodiment of the present disclosure, the movement of the cover fixing unit 130 can be prevented by the first magnetic element 130S embedded in the guild rail 130*r* in a state in which the rotation of the connector cover 120 is blocked by the cover area 130P.

Figure 8:
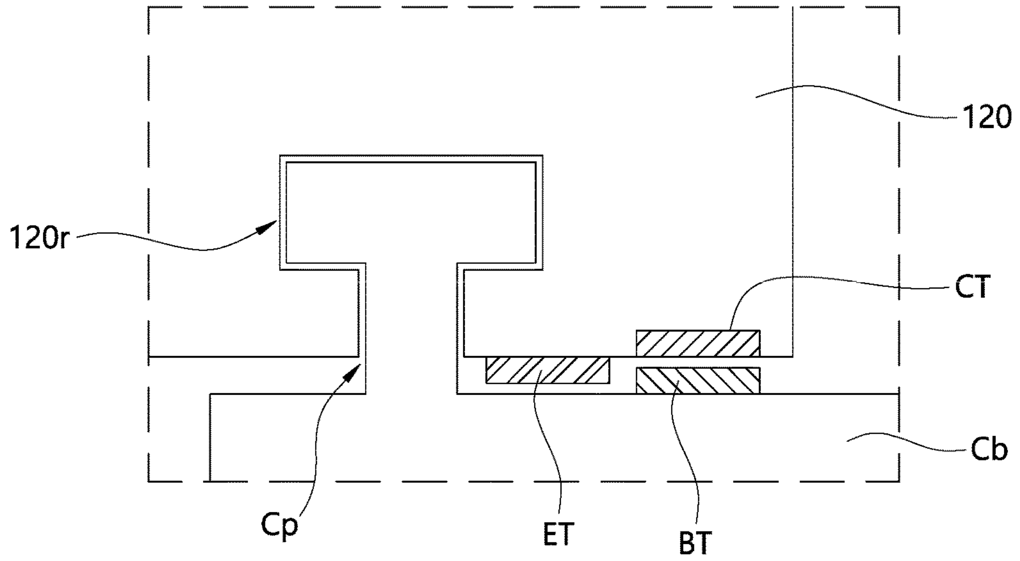

The cable connector 100 according to another embodiment of the present disclosure can include an elastic element ET attached to a surface of the connector cover 120 toward the base substrate 101 and disposed between the connector terminals CT of the connector cover 120 and the guide groove 120*r*, as shown in FIG. 8. Thus, in the cable connector 100 according to another embodiment of the present disclosure, the damage of the connector terminals CT due to the cable terminals BT can be prevented during the fastening process and sliding process of the flat cable Cb.

Figure 9:
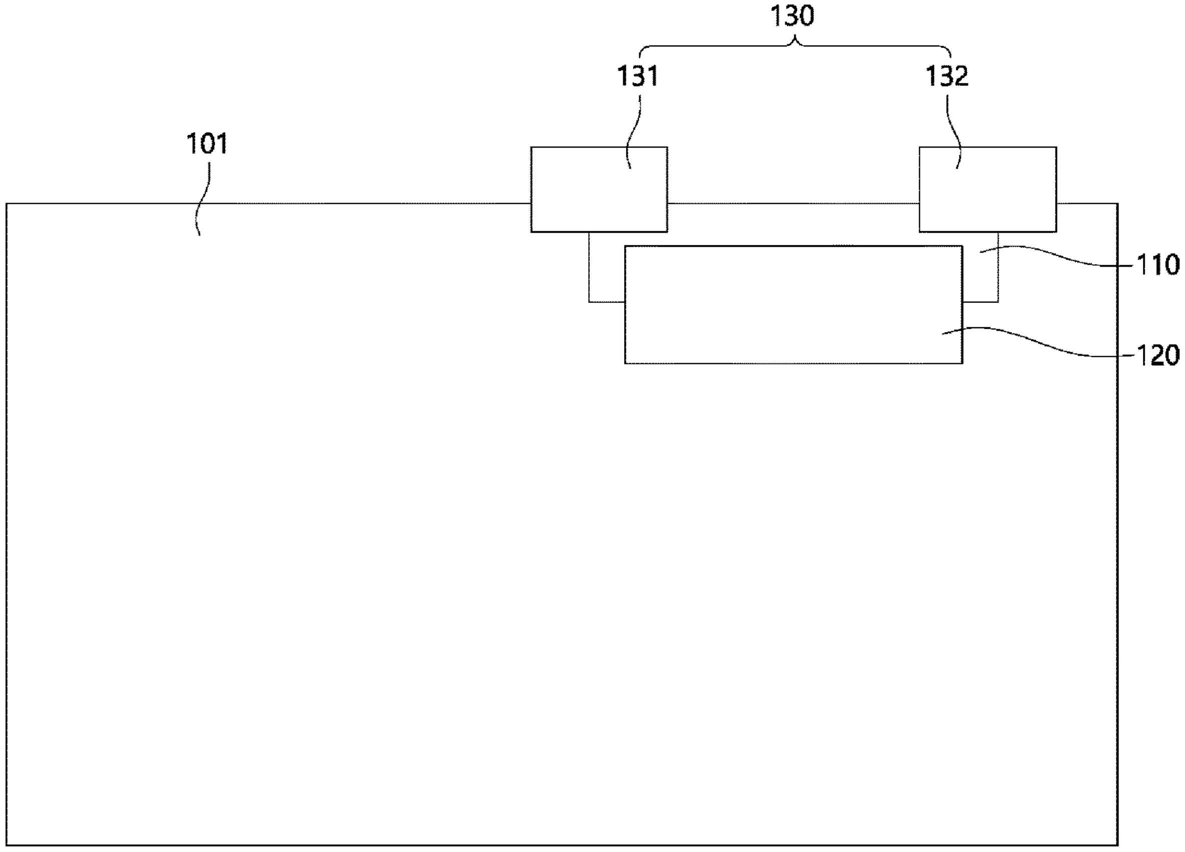

The connector cable 100 according to the embodiment of the present disclosure is described that the cover fixing unit 130 is disposed a side of the connector body 110. However, the cable connector according to another embodiment of the present disclosure can include the cover fixing units 131 and 132 disposed on both sides of the connector body 110, as shown in FIG. 9. Thus, in the cable connector according to another embodiment of the present disclosure, the rotation of the connector cover 120 in a state in which the connector terminals CT are connected to the cable terminals BT can be effectively blocked.

Figure 10:
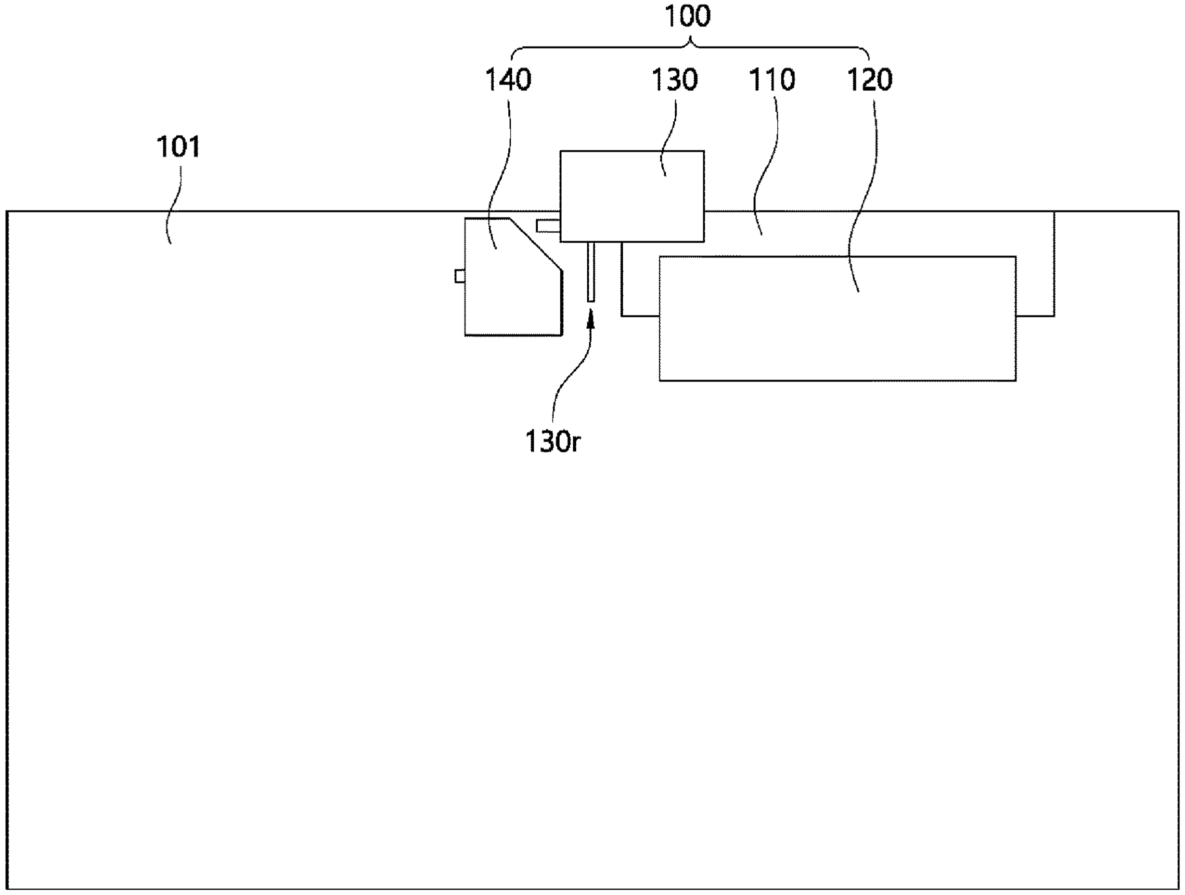

In the cable connector 100 according to another embodiment of the present disclosure, a fix coupling unit 140 can be disposed outside the cover fixing unit 130, as shown in FIG. 10. The fix coupling unit 140 can prevent the movement of the cover fixing unit 130 in a state in which the connector terminals CT are connected to the cable terminals BT. For example, the fix coupling unit 140 can be fixed at the base substrate 101.

FIGS. 11A to 11D are views sequentially showing the fastening process of the fix coupling unit 140 and the cover fixing unit 130 in the connector cable 100 according to another embodiment of the present disclosure.

The fastening process of the fix coupling unit 140 and the cover fixing unit 130 in the cable connector 100 according to another embodiment of the present disclosure will be described with reference to FIGS. 11A to 11D.

Figure 11A:
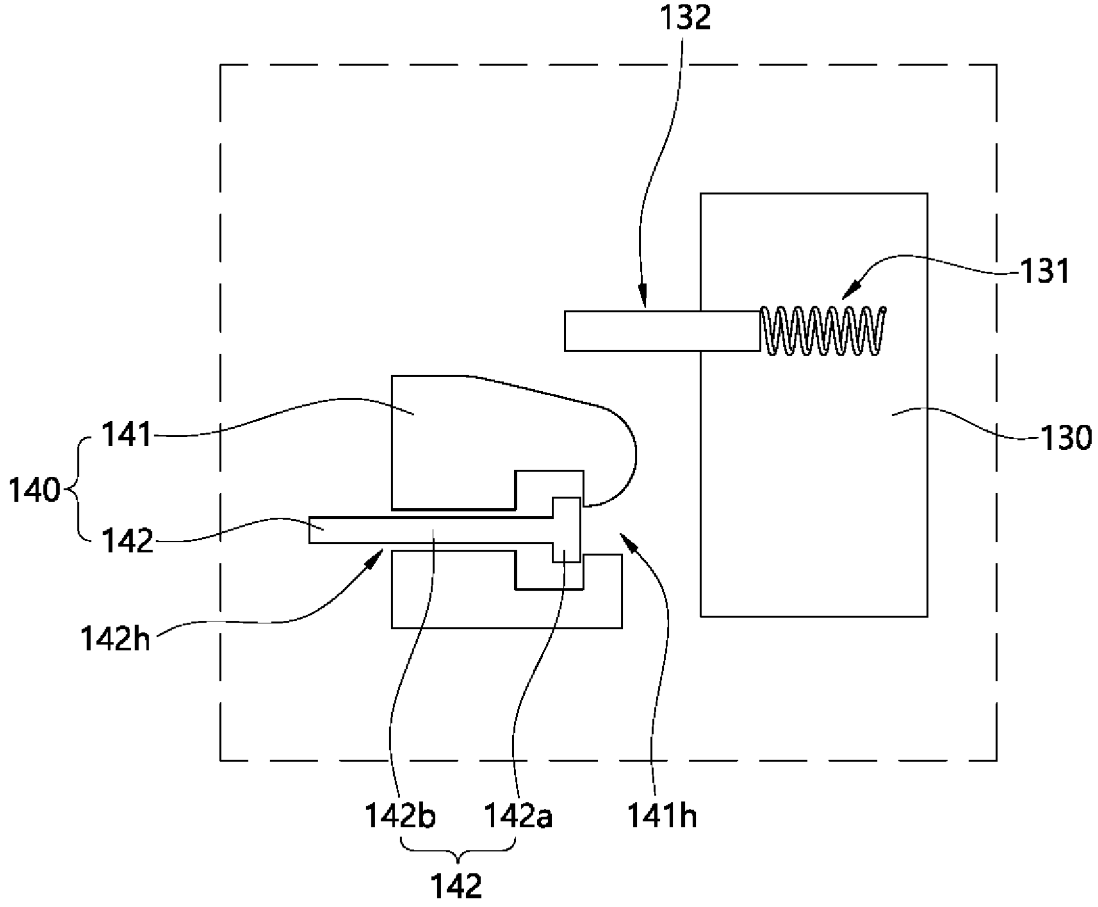

First, the fix coupling unit 140 can include a coupling body 141 having an inner space and a coupling protrusion 142, as shown in FIG. 11A. The coupling body 141 can include a first hole 141*h* toward the cover fixing unit 130 and a second hole 142*h* opposite to the first hole 141*h*. The coupling protrusion 142 can include a head portion 142*a* disposed in the inner space and a protruding portion 142*b* extending from the head portion 142*a* to pass through the second hole 142*h*. For example, the head portion 142*a* can be larger than the second hole 142*h*. The cover fixing unit 130 can include a projection part 132 protruding toward the fix coupling unit 140 and an elastic body 131 fastened to the projection part 132.

Figure 11B:
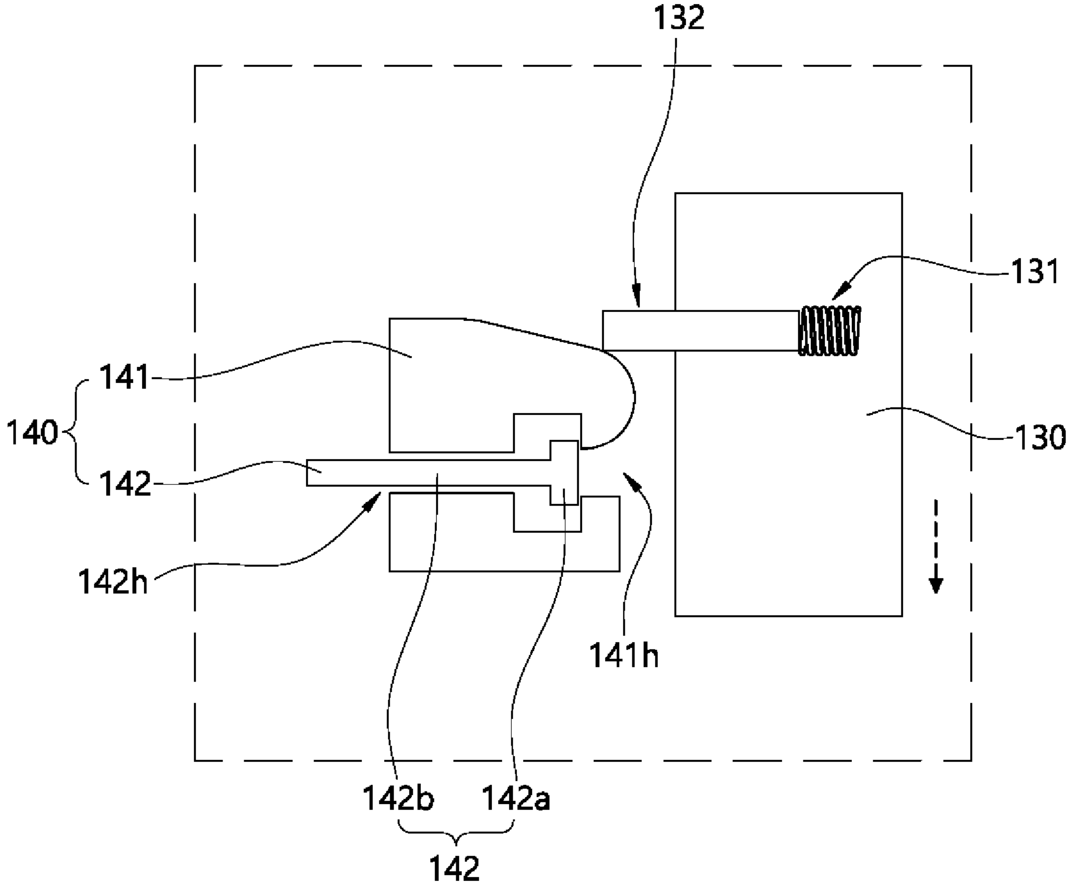
Figure 11C:
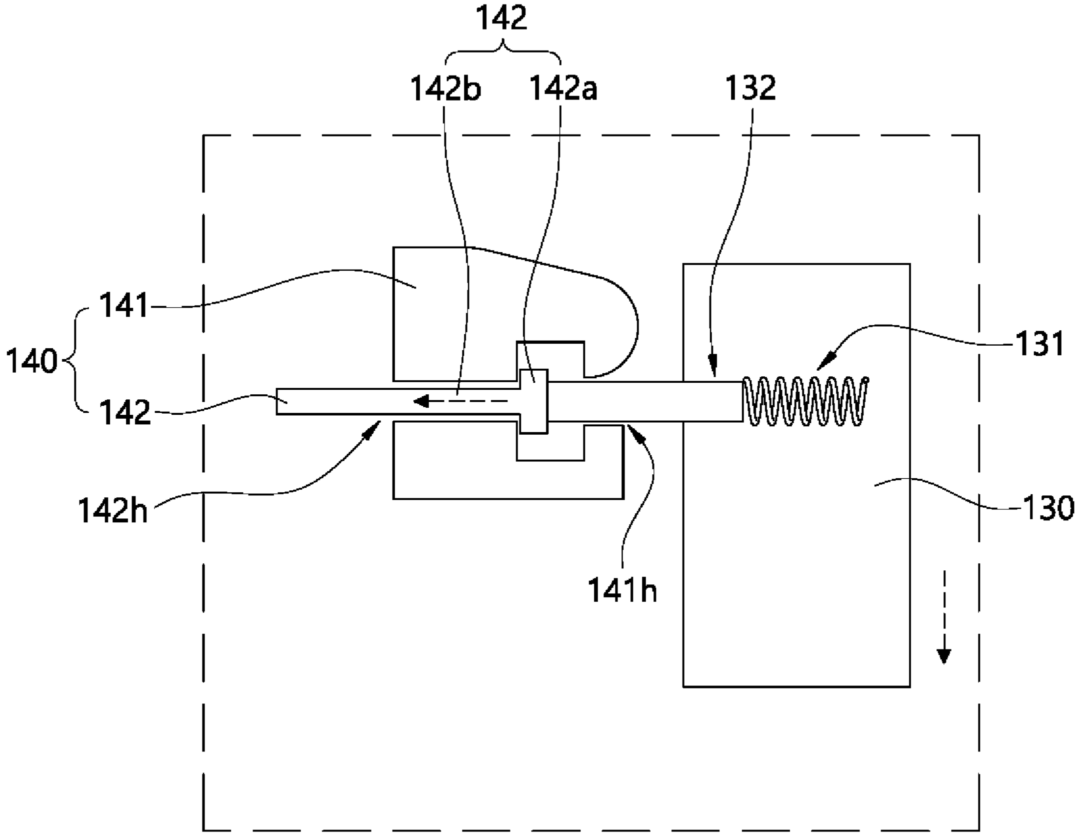
Figure 11D:
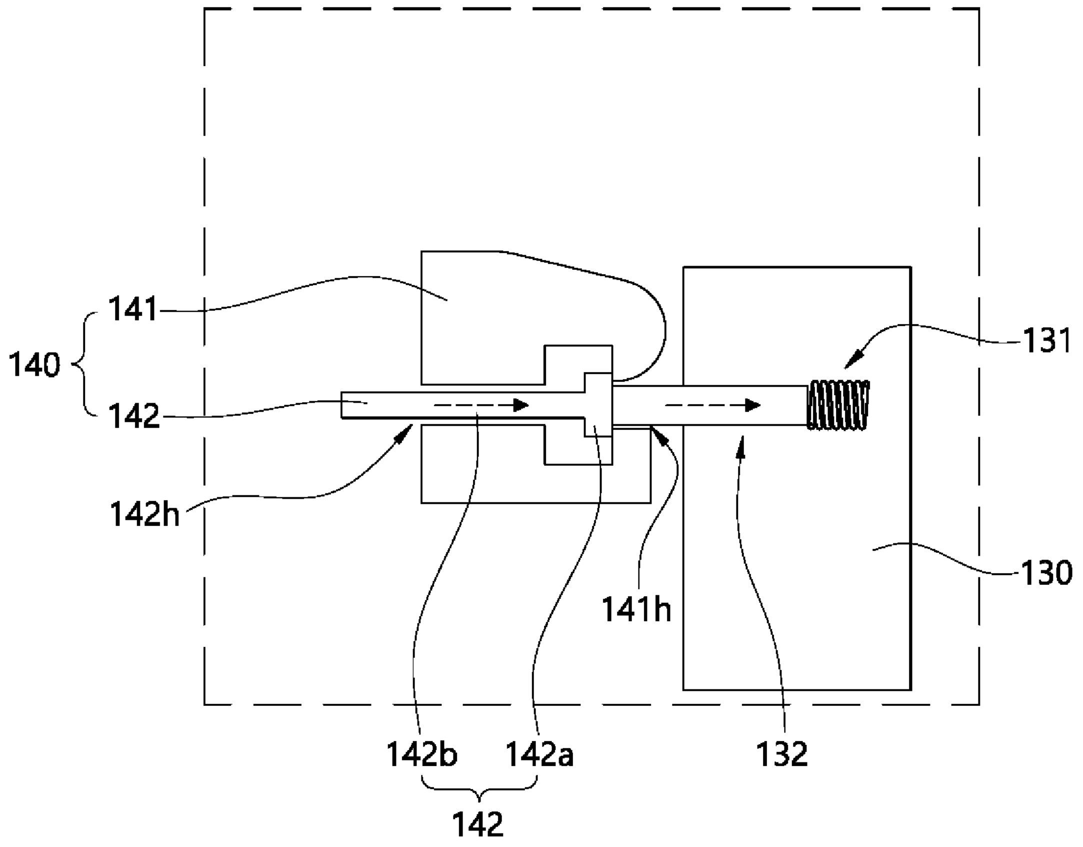

A surface of the coupling body 141 toward the cover fixing unit 130 can be a curved surface. Thus, the elastic body 131 can be compressed by the projection part 132 according to the movement of the cover fixing unit 130, as shown in FIG. 11B. The projection part 132 can be inserted in the first hole 141*h* of the coupling body 141 by the elastic body 131 according to the movement of the cover fixing unit 130, as shown in FIG. 11C. Thus, the coupling protrusion 142 can be pushed toward the second hole 142*h*. For example, the cover fixing unit 130 can be fastened to the fix coupling unit 140 by the projection part 132 and the elastic body 131. In the connector cable according to another embodiment of the present disclosure, when the coupling protrusion 142 is pressed in the direction of the cover fixing unit 130 by external pressure, the projection part 132 presses the elastic body 131 to come out of the coupling body 141, as shown in FIG. 11D. For example, in the cable connector according to another embodiment of the present disclosure, the movement of the cover fixing unit 130 can be effectively prevented in a state in which the connector terminals CT are connected to the cable terminals BT. Therefore, in the cable connector according to another embodiment of the present disclosure, the connection state between the connector terminals CT and the cable terminals BT can be stably maintained, without the damage of the flat cable.

As a result, the cable connector according to the embodiments of the present disclosure can comprise the guide groove extending the width direction of the fixed and fastened flat cable, wherein the flat cable can be inserted along the guide groove. Thus, the cable connector according to the embodiments of the present disclosure can prevent over-insertion of the flat cable. Thereby, the cable connector according to the embodiments of the present disclosure can prevent the damage of the flat cable in the fixing and fastening process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cable connector comprising:

a connector body disposed on a base substrate;

a connector cover rotatable fastened to the connector body, and including connector terminals arranged side by side along an edge of an end of the connector cover, a cover fixing unit disposed on a side of the connector body, the cover fixing unit extending on an upper surface of the connector body; and a guide rail disposed between the base substrate and the cover fixing unit, the guide rail providing a moving path of the cover fixing unit, wherein the connector cover further includes a guide groove extending in a direction in which the connector terminals are arranged.

2. The cable connector according to claim 1, wherein the guide groove includes a first region extending from a surface of the connector cover, and a second region connected to the first region, and wherein the second region has a larger width than the first region.

3. The cable connector according to claim 1, further comprising:

a first magnetic element embedded in the guide rail; and a second magnetic element embedded in the cover fixing unit to corresponding to the first magnetic element.

4. The cable connector according to claim 3, wherein the first magnetic element is disposed at an end of the guide rail toward the connector terminals of the connector cover.

5. The cable connector according to claim 1, further comprising:

a first magnetic element embedded in a surface of the connector body toward the cover fixing unit; and a second magnetic element embedded in the cover fixing unit to corresponding to the first magnetic element.

6. The cable connector according to claim 5, wherein the first magnetic element is disposed at an end of the connector body toward the connector terminals of the connector cover.

7. The cable connector according to claim 1, further comprising:

an elastic element attached to a surface of the connector cover toward the base substrate, the elastic element disposed between the guide groove and the connector terminals.

8. The cable connector according to claim 1, further comprising:

a fix coupling unit disposed outside of the cover fixing unit, wherein the fix coupling unit includes a coupling body having an inner space, and a coupling protrusion.

9. The cable connector according to claim 8, wherein the coupling body includes a first hole toward the cover fixing unit and a second hole opposite to the first hole, and wherein the coupling protrusion includes a head portion disposed inside the inner space, and a protruding portion extending from the head portion to pass through the second hole.

10. The cable connector according to claim 9, wherein the cover fixing unit includes a projection part protruding toward the fix coupling unit, and an elastic body fastened to the projection part.

* * * * *